(12) United States Patent
Chen et al.

(10) Patent No.: US 10,223,728 B2
(45) Date of Patent: Mar. 5, 2019

(54) SYSTEMS AND METHODS OF PROVIDING RECOMMENDATIONS BY GENERATING TRANSITION PROBABILITY DATA WITH DIRECTED CONSUMPTION

(71) Applicant: Google LLC, Mountain View, CA (US)

(72) Inventors: Aiyou Chen, Palo Alto, CA (US); Jeffrey David Oldham, San Jose, CA (US)

(73) Assignee: Google LLC, Mountain View, CA (US)

(*) Notice: Subject to any disclaimer, the term of this patent is extended or adjusted under 35 U.S.C. 154(b) by 848 days.

(21) Appl. No.: 14/564,123

(22) Filed: Dec. 9, 2014

(65) Prior Publication Data

US 2016/0162975 A1   Jun. 9, 2016

(51) Int. Cl.
*G06Q 30/00* (2012.01)
*G06Q 30/06* (2012.01)
*G06N 7/00* (2006.01)

(52) U.S. Cl.
CPC ......... *G06Q 30/0631* (2013.01); *G06N 7/005* (2013.01)

(58) Field of Classification Search
CPC .................................................. G06Q 30/00
See application file for complete search history.

(56) References Cited

U.S. PATENT DOCUMENTS

| 6,233,517 B1 * | 5/2001 | Froeberg | G06Q 10/047 340/907 |
| 9,110,817 B2 * | 8/2015 | Pachet | G06F 17/10 |
| 9,275,299 B2 * | 3/2016 | Den Hollander | G06K 9/4652 |
| 9,959,563 B1 * | 5/2018 | Wu | G06Q 30/0631 |
| 2008/0250026 A1 | 10/2008 | Linden et al. | |

(Continued)

FOREIGN PATENT DOCUMENTS

| WO | 2013104005 A1 | 7/2013 |
| WO | 2014142890 A1 | 9/2014 |

OTHER PUBLICATIONS

Berd, Arthur M., "Dynamic Estimation of Credit Rating Transition Probabilities", Lehman Brothers Inc., dated Jan. 2005 (Year: 2005).*

(Continued)

*Primary Examiner* — Mark A Fadok
(74) *Attorney, Agent, or Firm* — Shumaker & Sieffert, P.A.

(57) ABSTRACT

Systems and methods of directed item consumption recommendations are disclosed which include generating, with a server, empirical transition matrix data that includes row data for a first item and column data for a second item, and an entry in the empirical transition matrix data for a number of users that acquire the second item after the first item, generating, with the server, metadata transition matrix data by partitioning items for each item metadata type, setting a uniform transition probability for all items in the partition, and summing the uniform transition probabilities across all metadata types, generating, with the server, transition probability matrix data by multiplying the metadata transition matrix data with a weight parameter, adding the result to the empirical transition matrix data, and normalizing each row, and providing item recommendations to a user computing device communicatively coupled to the server according to the generated transition probability matrix data.

26 Claims, 6 Drawing Sheets

(56) References Cited

U.S. PATENT DOCUMENTS

| | | | | |
|---|---|---|---|---|
| 2009/0289942 | A1* | 11/2009 | Bailloeul | G06F 17/30256 345/440 |
| 2009/0299996 | A1* | 12/2009 | Yu | G06F 17/30867 |
| 2010/0323775 | A1* | 12/2010 | Stanley | A63F 13/12 463/2 |
| 2011/0246386 | A9* | 10/2011 | Keenan | G06Q 40/06 705/36 R |
| 2012/0016432 | A1* | 1/2012 | Westendorp | A61B 5/7475 607/4 |
| 2012/0036123 | A1 | 2/2012 | Hasan et al. | |
| 2012/0173324 | A1 | 7/2012 | Vallery et al. | |
| 2012/0203627 | A1* | 8/2012 | Balseiro | G06Q 30/08 705/14.46 |
| 2012/0253707 | A1* | 10/2012 | Qi | G01N 29/043 702/56 |
| 2012/0265774 | A1* | 10/2012 | Saul | G06N 3/02 707/754 |
| 2012/0317040 | A1* | 12/2012 | Shaffer | G06Q 90/00 705/310 |
| 2012/0317041 | A1* | 12/2012 | Shaffer | G06Q 90/00 705/310 |
| 2012/0330778 | A1* | 12/2012 | Eastham | G06Q 30/02 705/26.7 |
| 2013/0103371 | A1* | 4/2013 | Huang | G06N 7/005 703/2 |
| 2014/0067466 | A1* | 3/2014 | Xiao | G06Q 30/0201 705/7.31 |
| 2014/0114977 | A1* | 4/2014 | Coifman | G06F 17/30675 707/737 |
| 2014/0207718 | A1* | 7/2014 | Bento Ayres Pereira | G06F 17/30035 706/12 |
| 2015/0066816 | A1* | 3/2015 | Charif | G06Q 10/0633 706/11 |
| 2016/0155062 | A1* | 6/2016 | Fisher | G06N 99/005 706/12 |

OTHER PUBLICATIONS

Rendle, Steffen et al., "Factorizing Personalized Markov Chains for Next-Basket Recommendation", dated 2010. (Year: 2010).*

Viswanath et al, "Fastest way to divide elements of a row with rowsum", discussion thread on R Help, dated Sep. 17, 2009. (Year: 2009).*

Stackexchange.com, "Distance—what is the purpose of row normalization", date Oct. 6, 2015 (Year: 2015).*

Linden, et al., "Amazon.com Recommendations: Item-to-Item Collaborative Filtering", by Amazon.com, Journal IEEE Internet Computing, 2003.

Wikipedia, Collaborative filtering; http://en.wikipedia.org/wiki/Collaborative_filtering; Oct. 25, 2014.

Wikipedia, Netflix Prize; http://en.wikipedia.org/wiki/Netflix_Prize; Oct. 6, 2014.

* cited by examiner

SYSTEMS AND METHODS OF PROVIDING RECOMMENDATIONS BY GENERATING TRANSITION PROBABILITY DATA WITH DIRECTED CONSUMPTION

BACKGROUND

Many systems for providing recommendations utilize collaborative filtering, which is a process for filtering for information or patterns using techniques involving collaboration among multiple data points or sources. That is, recommendations are typically made according to user-based collaborative filtering, where items are recommended according to items purchased by similar users. Recommendations are also presently made by systems using item-based collaborative filtering (i.e., the cross-selling of items). Some present systems provide search-based collaborative filtering or content-based collaborative filtering.

Present systems for recommending items are typically skewed, so that popular items are more frequently recommended. Moreover, present systems do not account for direction in item consumption, where, for example, users are more likely to consume item B after item A, but less likely to consume item A after item B.

BRIEF SUMMARY

Embodiments of the disclosed subject matter provide systems and methods of improving revenue and expanding user experiences when recommending items for a user to acquire. In particular, some items and/or content may be acquired without cost, while acquiring other items and/or content may be incurred with cost. The embodiments of the disclosed subject matter allow for the promotion of items and/or content that do not have a cost to acquire, while also increasing revenue by promoting items of interest to a user that have a cost to acquire, so as to expand recommendation experiences to a user for items that may be of interest. As the acquisition of items may occur sequentially, the systems and methods of the disclosed subject matter provide recommendations which consider the sequential order of acquiring items so as to expand recommendation experiences to a user for items that may be of interest. That is, the systems and method of the disclosed subject matter consider directionality of acquiring items (e.g., users may be more likely to consume item B after item A, but less likely to consume item A after item B) in providing expanded recommendation experiences to a user.

In embodiments of the disclosed subject matter, a user's next acquisition of an item by a download, purchase, share, or viewing operation, may depend upon the user's previous acquisitions. The systems and methods disclosed herein provide an expanded user experience for recommending items to acquire by generating transition data according to a user's previous acquisitions.

According to an embodiment of the disclosed subject matter, a method is provided that includes generating, with a server, empirical transition matrix data that includes row data for a first item and column data for a second item, and an entry in the empirical transition matrix data for a number of users that acquire the second item after the first item, generating, with the server, metadata transition matrix data by partitioning items for each item metadata type, setting a uniform transition probability for all items in the partition, and summing the uniform transition probabilities across all metadata types, generating, with the server, transition probability matrix data by multiplying the metadata transition matrix data with a weight parameter, adding the result to the empirical transition matrix data, and normalizing each row, and providing item recommendations to a user computing device communicatively coupled to the server according to the generated transition probability matrix data.

According to an embodiment of the disclosed subject matter, a system is provided that includes a user computing device, and a server that is communicatively coupled to the user computer device, the server to generate empirical transition matrix data that includes row data for a first item and column data for a second item, and an entry in the empirical transition matrix data for a number of users that acquire the second item after the first item, to generate metadata transition matrix data by partitioning items for each item metadata type, set a uniform transition probability for all items in the partition, and sum the uniform transition probabilities across all metadata types, and to generate transition probability matrix data by multiplying the metadata transition matrix data with a weight parameter, add the result to the empirical transition matrix data, and normalize each row, and provide item recommendations to the user computing device according to the generated transition probability matrix data.

According to an embodiment of the present general inventive concept, a method is provided that includes generating, with a server, empirical transition matrix data that includes row data for a first item and column data for a second item, and an entry in the empirical transition matrix data for a number of users that acquire the second item after the first item, generating, with the server, metadata transition matrix data according to a selected prior, generating, with the server, transition probability matrix data by multiplying the metadata transition matrix data with a weight parameter, adding the result to the empirical transition matrix data, and normalizing each row, and providing item recommendations to a user computing device communicatively coupled to the server according to the generated transition probability matrix data.

According to an embodiment of the present general inventive concept, a system is provided that includes a user computing device, and a server that is communicatively coupled to the user computer device, the server to generate empirical transition matrix data that includes row data for a first item and column data for a second item, and an entry in the empirical transition matrix data for a number of users that acquire the second item after the first item, to generate metadata transition matrix data according to a selected prior, to generate transition probability matrix data by multiplying the metadata transition matrix data with a weight parameter, adding the result to the empirical transition matrix data, and normalizing each row, and provide item recommendations to the user computing device according to the generated transition probability matrix data.

According to an embodiment of the disclosed subject matter, a method is provided that include generating, with a server, empirical transition matrix data that includes row data for a first item and column data for a second item, and an entry in the empirical transition matrix data for a number of users that acquire the second item after the first item, normalizing, with the server, each row of the empirical transition matrix data directly when other data, including metadata, is unavailable, and providing item recommendations to a user computing device communicatively coupled to the server according to the normalized empirical matrix data.

According to an embodiment of the disclosed subject matter, means for providing directed item consumption recommendations are provided including generating, with a server, empirical transition matrix data that includes row data for a first item and column data for a second item, and an entry in the empirical transition matrix data for a number of users that acquire the second item after the first item, generating, with the server, metadata transition matrix data by partitioning items for each item metadata type, setting a uniform transition probability for all items in the partition, and summing the uniform transition probabilities across all metadata types, generating, with the server, transition probability matrix data by multiplying the metadata transition matrix data with a weight parameter, adding the result to the empirical transition matrix data, and normalizing each row, and providing item recommendations to a user computing device communicatively coupled to the server according to the generated transition probability matrix data.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Embodiments of the presently disclosed subject matter may provide expanded user recommendation experiences for items by providing directional recommendations according to a user's previously acquired items, and minimizing skewing by merely recommending the most popular items. Because many items to be recommended may have a number of acquisitions that is less than a minimum threshold, traditional recommender systems may have increased difficulty in providing a recommendation for a second item after a first item with few acquisitions. That is, when a relatively small number of users have acquired a particular item, an automated recommendation system may have difficulty in accurately determining whether or when to recommend that item to other users, and/or when a particular recommendation is likely to result in an additional acquisition of the item by a new user. The systems and methods disclosed herein expand a recommendation experience for a user by identifying items to acquire that follow a user's previously acquired items. The embodiments of the disclosed subject matter allow for the promotion of items and/or content that do not have a cost to acquire, while also increasing revenue by promoting items of interest to a user that have a cost to acquire, so as to expand recommendation experiences to a user for items that may be of interest.

The embodiments of the disclosed subject matter improve efficiency of recommendation systems such that relevancy of recommended items is increased by accounting for directionality in the acquisition of items. Recommended items can include, for example, physical and/or tangible goods, media data, information data, applications, and service providers. The embodiments of the disclosed subject matter may improve efficiency of recommendation systems by reducing the amount of skew (e.g., reduced quality of recommendations because of limited acquisition data) in providing recommendations of items.

Figure 1:
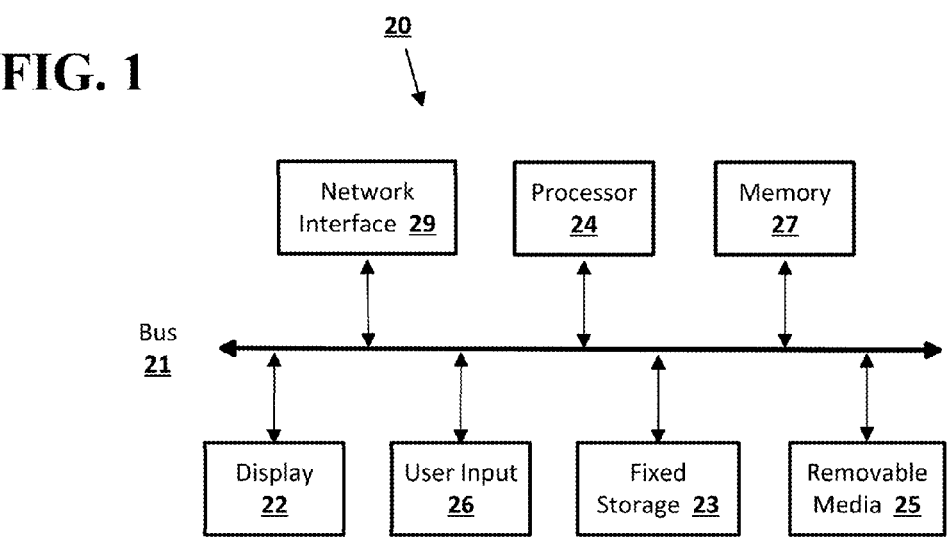
FIG. 1 shows a computing device according to an embodiment of the disclosed subject matter.

Embodiments of the presently disclosed subject matter may be implemented in and used with a variety of component and network architectures. FIG. 1 is an example computing device 20 suitable for implementing embodiments of the presently disclosed subject matter. The device 20 may be, for example, a desktop or laptop computer, or a mobile computing device such as a smart phone, tablet, e-book reader, digital media player, home media server, set-top box, video game console, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces.

The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
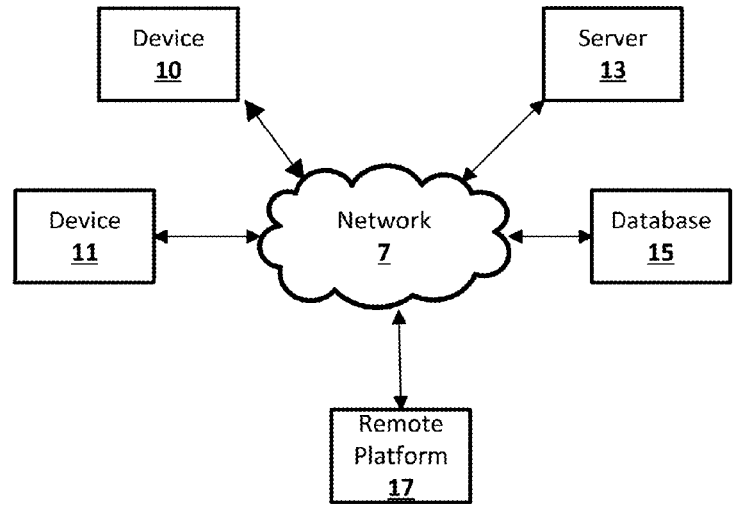
FIG. 2 shows a network configuration according to an embodiment of the disclosed subject matter.

FIG. 2 shows an example network arrangement according to an embodiment of the disclosed subject matter. One or more devices 10, 11, such as local computers, smart phones, tablet computing devices, e-book readers, digital media players, home media servers, set-top boxes, video game consoles, and the like may connect to other devices via one or more networks 7. Each device may be a computing device as previously described. The network may be a local network, wide-area network, the Internet, or any other suitable communication network or networks, and may be implemented on any suitable platform including wired and/or wireless networks. The devices may communicate with one or more remote devices, such as servers 13 and/or databases 15. The remote devices may be directly accessible by the devices 10, 11, or one or more other devices may provide intermediary access such as where a server 13 provides access to resources stored in a database 15. The devices 10, 11 also may access remote platforms 17 or services provided by remote platforms 17 such as cloud computing arrangements and services. The remote platform 17 may include one or more servers 13 and/or databases 15.

Figure 3:
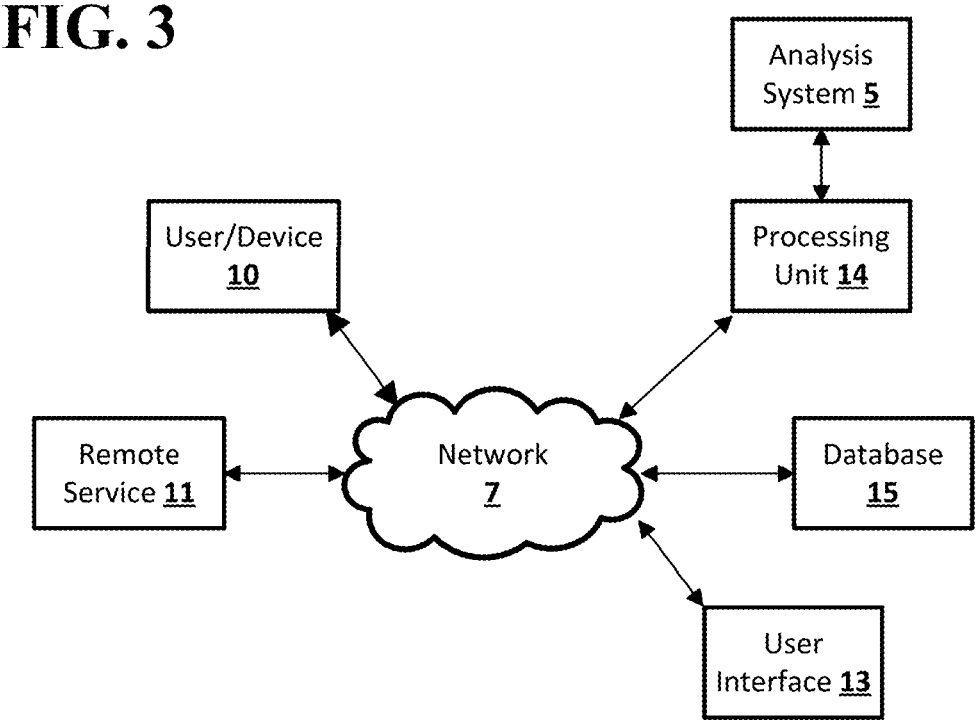
FIG. 3 shows an example network and system configuration according to an embodiment of the disclosed subject matter.

FIG. 3 shows an example arrangement according to an embodiment of the disclosed subject matter. One or more devices or systems 10, 11, such as remote services or service providers 11, user devices 10 such as local computers, smart phones, tablet computing devices, e-book readers, digital media players, home media servers, set-top boxes, video game consoles, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may be for an electronic store to purchase and/or download items and/or media content, or to purchase physical and/or tangible goods. The user interface 13 may be for a content distribution system to view and/or download content. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

Figure 4:
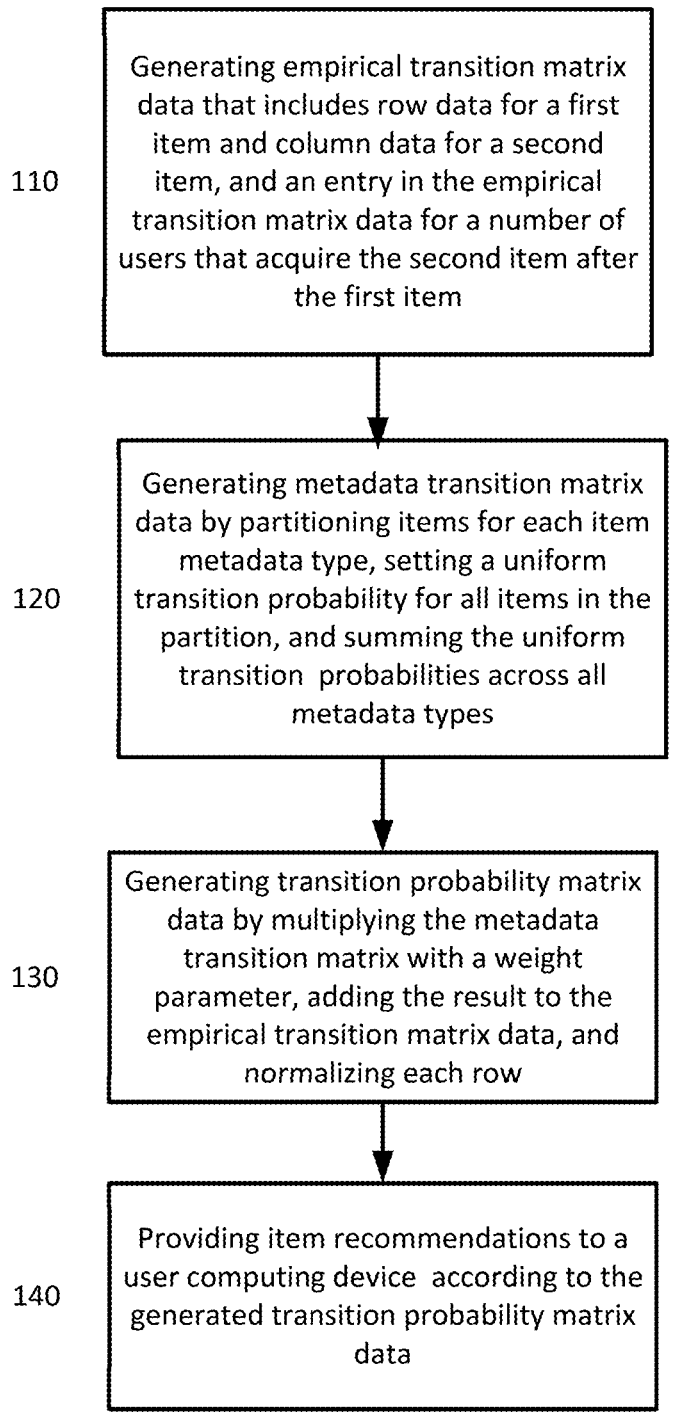
FIG. 4 shows an example method of providing recommendations to a user device to expand the recommendation experience according to an embodiment of the disclosed subject matter.

FIG. 4 shows an example method 100 of providing recommendations for items to a user computing device to expand the recommendation experience according to an embodiment of the disclosed subject matter. As disclosed herein, items may be any product and/or service that may be viewed, downloaded, purchased, shared, and/or acquired. For example, the systems and method disclosed herein may provide recommendations to acquired items that may be physical and/or tangible goods, media data, information data, applications, and service providers. In operation 110, a server, such as server 13 illustrated in FIG. 2, or processing unit 14 and analysis system 5 illustrated in FIG. 3, may generate empirical transition matrix data that includes row data for a first item and column data for a second item. Alternatively, empirical transition matrix data may be generated that includes column data for a first item and row data for a second item. It is noted, however, the operations discussed below would need to be transposed to maintain consistency with respect to row data and column data. The server may also generate an entry in the empirical transition matrix data for the number of users that acquire the second item after the first item.

For example, the server may generate an empirical $(n+1)$-by-$(n+1)$ transition matrix (e.g., empirical transition matrix A) with row i for item i, column j for item j, and entry (i,j) for the number of users who acquire item j after item i, for $1, j$ in $\{1, 2, \ldots, n\}$. For the $(n+1)$-th row of the empirical transition matrix, its j-th entry is the number of new users whose first acquisition is item j. The $(n+1)$-th column may be all 0. That is, in operation 110, the server may form an un-normalized empirical transition matrix.

In operation 120, the server may generate metadata transition matrix data by partitioning items for each item metadata type. For example, the server may set a uniform transition probability for all items in the partition, and may sum the uniform transition probabilities across all metadata types.

That is, in operation 120, the server may generate a metadata $(n+1)$-by-$(n+1)$ transition matrix (e.g., metadata transition matrix M) with row i for item i and column j for item j. For each item metadata type, the server may partition the items, and assume a uniform transition probability among all items within the partition. For example, if the item is a book, the book metadata types may include author, subject, and the like, and the server may assume a uniform transition probability among all books within the partition. For the author metadata type, the books may be partitioned by author, and the server may assume a uniform transition probability among all books within each partition. The server may generate the metadata transition matrix (M) by summing these probabilities across all metadata types. The (n+1)-th row and column of M is all 0.

The server may generate transition probability matrix data by multiplying the metadata transition matrix data (e.g., metadata transition matrix M) with a weight parameter (e.g., weight parameter w), adding the result to the empirical transition matrix data (e.g., empirical transition matrix A), and normalizing each row in operation 130. The server may normalize each row by dividing entries in each row by the sum of each row.

For example, a matrix C may be calculated by the equation $A+\lambda*M$, where A is the empirical transition matrix, M is metadata transition matrix, and $\lambda$ is a weight parameter. A transition probability matrix T may be generated by normalizing each row i of the matrix C by dividing its entries by its sum to yield the (n+1)-by-(n+1) transition probability matrix T with each entry in [0, 1] and each row sum is 1. By summing the metadata transition matrix M with the empirical transition matrix A, the server of the disclosed subject matter can improve results for items with few transactions. That is, the server may increase the user experience by providing increased relevant results with a reduced number of transactions. For example, for an item i with an empirical transition i->j and no other transitions should not yield 100% certainty of purchasing j. That is, the relevancy of the recommended items may be increased.

Optionally, the computation of the metadata transition matrix M may be generalized as a prior. For example, the metadata transition matrix M can be generated according to a transition model on metadata, according to the transpose of the empirical transition matrix A, according to other data, or according to any suitable combination thereof.

The relevancy of items recommended and the user experience may be expanded, as the systems and methods disclosed herein account for the directionality of item consumption, as opposed to typical recommendation systems using collaborative filtering.

Generally, large-scale recommender systems for items may be skewed, such that a plurality of items in such systems may have few transactions (e.g., purchases, downloads, views, sharing events, and the like). With the system disclosed herein, recommendations for items may be provided for items, even when an item has few transactions. As disclosed herein, summing the metadata transition data with the empirical transition data can reduced the relative skew of recommended results.

According to an embodiment of the disclosed subject matter, the server may assume an item transition is uniformly random within each item segment defined by item attributes. The server may generate a vector space representation, where V may be the vector of unique values of item attributes. For example, if the item is a book, the vector V of unique values of book attributes may include the subject, series name, text language, author, publisher, availability locale, title, and the like. In this example, $B_{ij}$ indicates whether the book-i has $V_j$, where B is a vector space representation of item attributes (e.g., book attributes). For example, book-i in a particular subject (e.g., political science/political process/general), may have $B_{ij}=1$ for three $V_j$, with values of political science, political science/political process, and political science/political process/general. The Dim(B) is n-by-m, but B may be very sparse. The metadata transition matrix (M) may be determined with the following equation:

$$M=BD^{-1}B^t$$

where D is equal to diag(colSums(B)), t is a transpose operator, I is an identity matrix (e.g., a matrix with diagonal entries of '1' and all other values being '0'), n is the number of items (e.g., books), and m is the number of item segments (e.g., book segments).

The server may provide item recommendations to a user computing device communicatively coupled to the server according to the generated transition probability matrix data (e.g., transition probability matrix T) at operation 140. The output transition matrix T may be expressed as T=RowNormalize $(A+\lambda M)$, and then the top k probabilities for each row are output. The top probabilities output may be used to provide recommendations for items to the user computing device.

According to embodiments of the disclosed subject matter, the server may combine the generated transition probability matrix data (e.g., transition probability matrix 7) with user history data to provide the item recommendations. The user history data may include items that the user has acquired. For example, if the items that the user has acquired previously are books, the system may determine the transition probabilities to a given candidate book, and accumulate the probabilities (e.g., as weighted by acquisition time of the previously-acquired books) into a score. The server may rank the candidate books based on the scores. That is, the candidate books with the highest scores may be used by the server to provide recommendations to a user computing device.

In embodiments of the disclosed subject matter, criteria for recommending the next item for consumption to a user may be relaxed. For example, the server may generate the transition probability matrix data according to next consumption data for a predetermined time window. The time window may be measured in minutes, hours, days, months, or the like, depending on the item. In embodiments of the disclosed subject matter, the server may generate the transition probability matrix data according to items acquired within the same time window. That is, the server may provide recommendations to a user computing device for an item according to the transition probability matrix data for items acquired at the same time and/or within the same time period (e.g., the same time window).

Embodiments of the disclosed subject matter may relax a counting strategy with weights. For example, if a user acquires multiple instances of the item j after the item i is acquired, the user may be weighted by the number of instances. In case of multiple types of transactions in the same recommendation system, a server in the system may generate transition-count tables, weighted-sum the generated transition-count tables, and normalize by rows as disclosed herein into a transition probability matrix.

Figure 5:
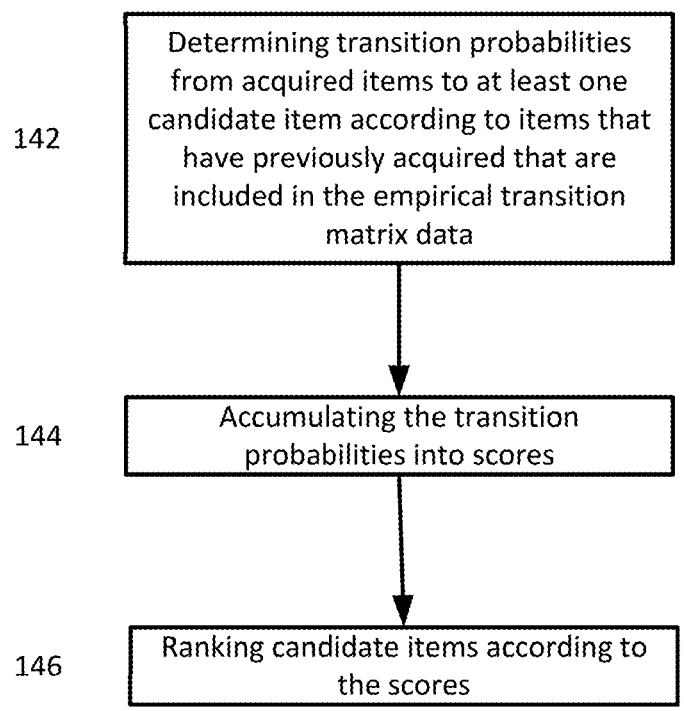
FIG. 5 shows an operation of the method illustrated in FIG. 4, the operation including providing item recommendations by ranking according to an embodiment of the disclosed subject matter.

FIG. 5 shows an operation of the method illustrated in FIG. 4, the operation including providing item recommendations by ranking according to an embodiment of the disclosed subject matter. At operation 142, a server (e.g., server 13 shown in FIG. 2 and described above, and/or processing unit 14 or remote service 11 shown in FIG. 3 and described above) may determine transition probabilities from acquired items to at least one candidate item according to items that have been previously acquired that are included in the empirical transition matrix data (e.g., the empirical transition matrix A described above). The server may accumulate the transition probabilities into scores at operation 144, and may rank candidate items according to the scores. The ranked candidate items may be transmitted from the server to a user computer device (e.g., devices 10, 11 as shown in FIG. 2 and described above). A user may select one of the ranked candidate items to acquire and/or purchase. The transmitted item recommendations may be the candidate items having the highest score for a predetermined number of items.

The machine learning system 5 illustrated in FIG. 3 and discussed above may retrieve user item acquisition data for one or more geographic locations for learning. The retrieved item acquisition data may be used by the server to train a transition table and calculate prediction accuracy on, for example, empirical item transitions in a predetermined date range (e.g., a one month period, a three month period, a six month period, a one year period, and the like).

In embodiments of the disclosed subject matter, a server may provide an expanded user experience for recommendations of items by identifying "significant" candidate transition pairs. That is, a significant candidate may be isolated by utilizing metadata attributes that are more restrictive. For example, when the item is a book, using author metadata may be more restrictive in isolating a candidate book. In a metadata mode, items (e.g., a book) may transit randomly within a segment. The segment of the book item may be defined by author, publisher, subject, series set, title, language, availability locale, and the like. If a segment is greater than a predetermined value, the system can ignore the transition probability. That is, in embodiments of the disclosed subject matter, significant transitions may come from segments with size being less than or equal to h, where h is a predetermined value (e.g., 100). Prediction accuracy may not change meaningfully when h is greater than 100, and thus h=100 may be used. For example, in a segment of books, where the segment is a subject and the subject is fiction, the segment may have 0.1M books. Thus, the transition probability due to "fiction" may be $1e^{-5}$, which may be determined as not being significant. Significant candidate transition pairs may be merged with candidates by overlap-segmentation and user transaction data.

In some embodiments, the metadata-based transition score may consider the transition probabilities contributed by common attributes (e.g., transition probabilities contributed by common attributes for two books), but may not take into account of the difference in the attributes themselves. For example, books A, B, and C may all have English as a primary language, but book B may have a secondary language as Chinese, and book C may have a secondary language of Spanish. That is, the scores for A->B and A->C should be different. The system disclosed herein may generate an improved transition score by considering both common attributes and different attributes with the following:

$$M=BD^{-1}B^t+(1/m)(1-B)(nI-D)^{-1}(1-B)^t$$

where B is a vector space representation of item attributes (e.g., book attributes), D is equal to diag(colSums(B)), t is a transpose operator, I is an identity matrix (e.g., a matrix with diagonal entries of '1' and all other values being '0'), n is the number of items (e.g., books), m is the number of item segments (e.g., book segments), and where (n, m)=dim (B).

In an example implementation of the system disclosed herein, the item to be recommended may be a book. Computing M, as described in detail above (e.g., where $M=BD^{-1}B^t$), may be computationally expensive. In embodiments of the disclosed subject matter, the server of the system may sequentially split books into segments according to the attributes until the maximum segment size is less than a threshold. The server of the system may define segments of the available books to recommend, where the segments may have overlap. For example, the server may define 1000 segments of books with overlap. The server may partition the books according to availability of books in a particular geographic or distribution region. For example, the server may partition the books according to their availability in the United States. The server may segment the partition of books available in the United States, for example, by subject, series name, language (e.g., English, Spanish, Korean, Italian, French, Japanese, Russian, German, Chinese, and the like), author, publisher, and the like. The server may split segments of a large predetermined size (e.g., segments having greater than 1000 entries, 5000 entries, 10,000 entries, or the like) by attributes sequentially. The server may merge segments of a small predetermined size (e.g., segments having less than 10, 50, 100, 500, or 1000 entries, or the like). That is, the server may form segments of books into a partition, where each book belongs to a segment size that is less that a predetermined segment size. In the metadata transition matrix M, as described above, the values may be zero, except for the segment book pairs. The entries in the metadata transition matrix M may be computing according to the follow equation:

$$M[i,j]=\sum_k \frac{B[i,k]B[j,k]}{D[k,k]} + \frac{1}{m}\sum_k \frac{(1-B[i,k])(1-B[j,k])}{n-D[k,k]}$$

where i and j are items, B is a vector space representation of item attributes (e.g., book attributes), D is equal to diag (colSums(B)), n is the number of items (e.g., books), m is the number of item segments (e.g., book segments), and k is number of segments.

Figure 6:
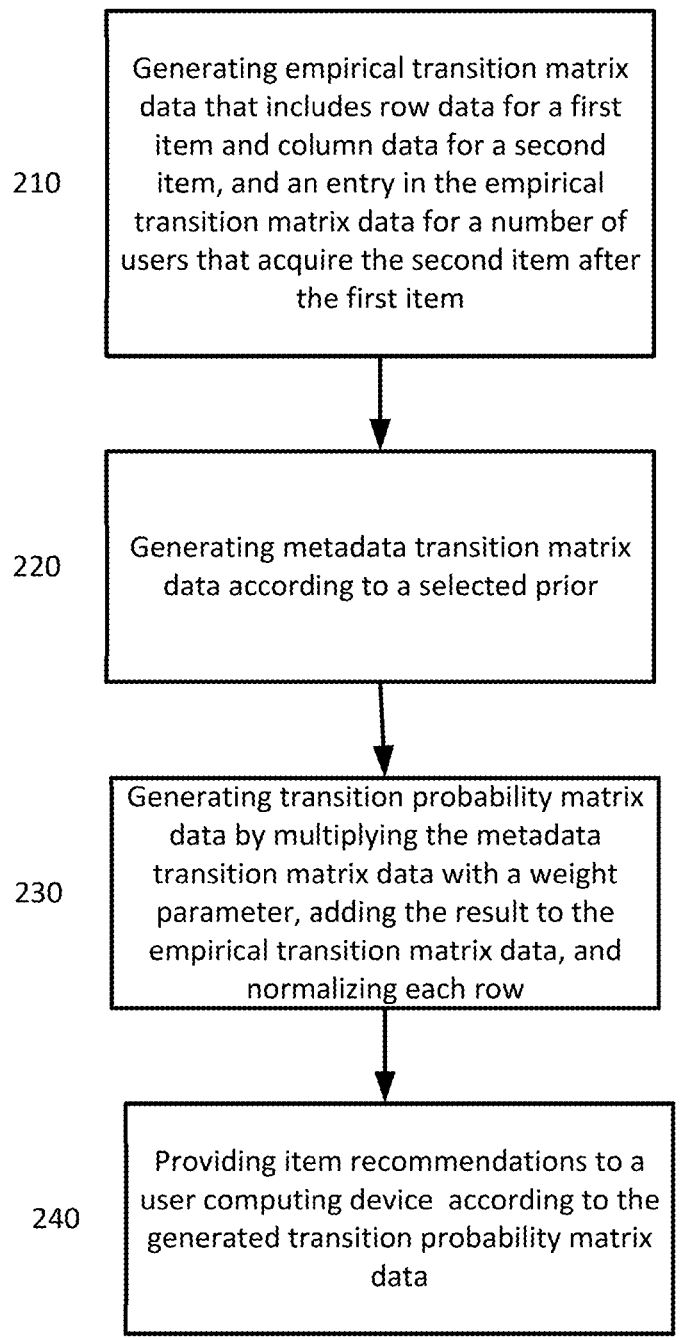
FIG. 6 shows an example method of providing recommendations to a user device to expand the recommendation experience according to an embodiment of the disclosed subject matter.

FIG. 6 shows an example method 200 of providing recommendations to a user device to expand the recommendation experience according to an embodiment of the disclosed subject matter. Operation 210 may be the same as operations 110 as shown in FIG. 4 and described above. In operation 220, a server may generate metadata transition matrix data according to a selected prior. In embodiments of the disclosed subject matter, any prior can be used, instead of the metadata transition matrix as described above in connection with FIG. 4. A plurality of priors, each having its own weight, can be used in generating the transition probability matrix data. For example, an undirected variant of A may be selected as a prior. For each item transition from i to j, the entries of A[i,j] and A[j, i] may be added. At operation 230, the server may generate transition probability matrix data by multiplying the metadata transition matrix data with a weight parameter, adding the result to the empirical transition matrix data, and normalizing each row. At operation 240, the server may providing item recommendations to a user computing device according to the generated transition probability matrix data.

Figure 7:
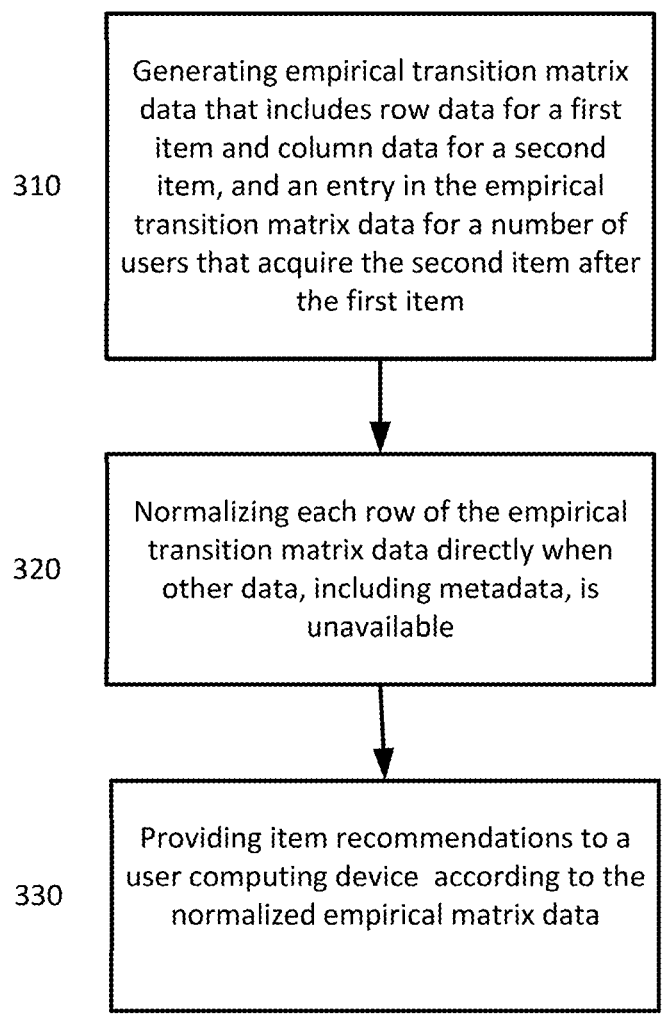
FIG. 7 shows an example method of providing recommendations to a user device to expand the recommendation experience according to an embodiment of the disclosed subject matter.

FIG. 7 shows an example method 300 of providing recommendations to a user device to expand the recommendation experience according to an embodiment of the disclosed subject matter. In operation 310, a server generates an empirical transition matrix data that includes row data for a first item and column data for a second item, and an entry in the empirical transition matrix data for a number of users that acquire the second item after the first item. The server may normalizing each row of the empirical transition matrix data directly when other data is unavailable in operation 320. That is, when no other data, such as metadata, is available, the server may normalize each row of the empirical transition matrix directly. The server may provide item recommendations to a user computing device communicatively coupled to the server according to the normalized empirical matrix data at operation 330.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user. Thus, the user may have control over how information is collected about the user and used by a system as disclosed herein.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method for enabling a computing system, to reduce model bias, when recommending a second item to a computing device, after the computing device accesses, from a network, a first item that is infrequently accessed by other computing devices on the network, the method comprising:

determining, by the computing system, a quantity of computing devices that have accessed any candidate item from a set of candidate items after accessing the first item;

determining, by the computing system, a first attribute of the first item and a second attribute of the first item;

determining, by the computing system, a first subset of candidate items of the set of candidate items, wherein a first attribute of each candidate item from the first subset of candidate items corresponds to the first attribute of the first item;

determining, by the computing system, a first probability of the computing device accessing any candidate item from the first subset of candidate items after accessing the first item;

determining, by the computing system, a second subset of candidate items from the set of candidate items, wherein a second attribute of each candidate item from the second subset of candidate items corresponds to the second attribute of the first item;

determining, by the computing system, a second probability of the computing device accessing any candidate item from the second subset of items after accessing the first item;

determining, by the computing system, based on the quantity of computing devices that have accessed any candidate item from the set of candidate items after accessing the first item, the first probability, and the second probability, a respective probability of the computing device accessing each candidate item from the set of candidate items after accessing the first item;

responsive to the computing device accessing the first item, outputting, by the computing system and to the computing device, an indication of a particular candidate item from the set of candidate items as the second item, wherein the respective probability of the computing device accessing the particular candidate item from the set of candidate items after accessing the first item is greater than or equal to the respective probability of the computing device accessing any other candidate item from the set of candidate items after accessing the first item; and responsive to receiving data indicating a user input selecting the second item, sending, by the computing system to the computing device, the second item rather than another candidate item from the set of candidate items when the probability of the computing device accessing the second item after accessing the first item is greater than or equal to the probability of the computing device accessing the another candidate item after accessing the first item.

2. The method of claim 1, wherein the first item is an e-book, the second item is an e-book, and the plurality of candidate items are e-books.

3. The method of claim 1,
wherein the first attribute includes one of an author, a publisher, a subject, a series set, a title, or a language, and
wherein the second attribute includes a different one of the author, the publisher, the subject, the series set, the title, or the language.

4. The method of claim 1, wherein the first probability is based on a quantity of candidate items of the first subset of candidate items, and wherein the second probability is based on a quantity of candidate items of the second subset of candidate items.

5. The method of claim 1, wherein determining the respective probability of the computing device accessing each respective candidate item from the set of candidate items after accessing the first item is responsive to:
determining, by the computing system, that a quantity of candidate items of the first subset of candidate items is less than a threshold quantity of items; and
determining, by the computing system, that a quantity of candidate items of the second subset of candidate items is less than the threshold quantity of items.

6. The method of claim 5, further comprising:
determining, by the computing system, a third attribute of the first item;
determining, by the computing system, a third subset of candidate items of the set of candidate items, wherein a third attribute of each candidate item from the third subset of candidate items corresponds to the third attribute of the first item; and
determining, by the computing system, whether a quantity of candidate items of the third subset of candidate items is greater than a threshold quantity of items,
wherein the respective probability of the computing device accessing each candidate item from the set of candidate items after accessing the first item is not based on the third subset of candidate items when the quantity of candidate items of the third subset of candidate items is greater than the threshold quantity of items.

7. The method of claim 1, further comprising:
determining, by the computing system, whether the first item has been accessed by the other computing devices on the network less than the threshold number of times; and
recommending the second item in response to determining that the first item has been accessed less than the threshold number of times.

8. The method of claim 1, wherein determining the respective probability of the computing device accessing each respective candidate item from the set of candidate items after accessing the first item is further based on user history data associated with a user of the computing device.

9. The method of claim 1, wherein determining the quantity of computing devices that have accessed the respective candidate item from the set of candidate items after accessing the first item comprises determining the quantity of computing devices that have accessed the respective candidate item within a predetermined time window.

10. A computing system comprising:
a processor;
memory comprising instructions that, when executed by the processor, cause the processor to:
determine a quantity of computing devices that have accessed any candidate item from a set of candidate items after accessing a first item;
determine a first attribute of the first item and a second attribute of the first item;
determine, a first subset of candidate items of the set of candidate items, wherein a first attribute of each candidate item from the first subset of candidate items corresponds to the first attribute of the first item;
determine a first probability of a computing device accessing any candidate item from the first subset of candidate items after accessing the first item;
determine a second subset of candidate items from the set of candidate items, wherein a second attribute of each candidate item from the second subset of candidate items corresponds to the second attribute of the first item;
determine a second probability of the computing device accessing any candidate item from the second subset of items after accessing the first item;
determine, based on the quantity of computing devices that have accessed any candidate item from the set of candidate items after accessing the first item, the first probability, and the second probability, a respective probability of the computing device accessing each candidate item from the set of candidate items after accessing the first item;
responsive to the computing device accessing the first item, output, to the computing device, an indication of a particular candidate item from the set of candidate items as the second item, wherein the respective probability of the computing device accessing the particular candidate item from the set of candidate items after accessing the first item is greater than or equal to the respective probability of the computing device accessing any other candidate item from the set of candidate items after accessing the first item; and
responsive to receiving data indicating a user input selecting the second item, send, to the computing device, the second item rather than another candidate item from the set of candidate items when the probability of the computing device accessing the second item after accessing first item is greater than or equal to the probability of the computing device accessing the another candidate item after accessing the first item.

11. The computing system of 10, wherein the first item is an e-book, the second item is an e-book, and the plurality of candidate items are e-books.

12. The computing system of claim 10,
wherein the first attribute includes one of an author, a publisher, a subject, a series set, a title, or a language, and
wherein the second attribute includes a different one of the author, the publisher, the subject, the series set, the title, or the language.

13. The computing system of claim 10, wherein the first probability is based on a quantity of candidate items of the first subset of candidate items, and wherein the second probability is based on a quantity of candidate items of the second subset of candidate items.

14. The computing system of claim 10, wherein execution of the instructions cause the processor to determine the respective probability of the computing device accessing the respective candidate item from the set of candidate items after accessing the first item in response to causing the processor to:
    determine that a quantity of candidate items of the first subset of candidate items is less than a threshold quantity of items; and
    determine that a quantity of candidate items of the second subset of candidate items is less than the threshold quantity of items.

15. The computing system of claim 14, wherein execution of the instructions further causes the processor to:
    determine a third attribute of the first item;
    determine a third subset of candidate items of the set of candidate items, wherein a third attribute of each candidate item from the third subset of candidate items corresponds to the third attribute of the first item; and
    determine whether a quantity of candidate items of the third subset of candidate items is greater than a threshold quantity of items,
    wherein the respective probability of the computing device accessing each candidate item from the set of candidate items after accessing the first item is not based on the third subset of candidate items when the quantity of candidate items of the third subset of candidate items is greater than the threshold quantity of items.

16. The computing system of claim 10, wherein execution of the instructions further causes the processor to:
    determine whether the first item has been accessed by the other computing devices on the network less than the threshold number of times; and
    recommend the second item in response to determining that the first item has been accessed less than the threshold number of times.

17. The computing system of claim 10, wherein execution of the instructions causes the processor to determine the respective probability of the computing device accessing each respective candidate item from the set of candidate items further based on user history data associated with a user of the computing device.

18. The computing system of claim 10, wherein execution of the instructions further causes the processor to determine the quantity of computing devices that have accessed the respective candidate item from the set of candidate items after accessing the first item by at least causing the processor to determine the quantity of computing devices that have accessed the respective candidate item within a predetermined time window.

19. A computer-readable storage medium, comprising instructions that, when executed by a processor of a computing system, cause the processor to:
    determine a quantity of computing devices that have accessed any candidate e-book from a set of candidate e-books after accessing the first e-book;
    determine an attribute of the first e-book;
    determine, a subset of candidate e-books of the set of candidate e-books, wherein an attribute of each candidate e-book from the subset of candidate e-books corresponds to the attribute of the first e-book;
    determine a probability of a computing device accessing any candidate e-book from the subset of candidate e-books after accessing the first e-book;
    determine, based on the quantity of computing devices that have accessed any candidate e-book from the set of candidate e-books after accessing the first e-book and the probability of the computing device accessing any candidate e-book from the subset of candidate e-books after accessing the first e-book first, a respective probability of the computing device accessing each candidate e-book from the set of candidate e-books after accessing the first e-book;
    responsive to the computing device accessing the first e-book, output, to the computing device, an indication of a particular candidate e-book from the set of candidate e-books as the second e-book, wherein the respective probability of the computing device accessing the particular candidate e-book from the set of candidate e-books after accessing the first e-book is greater than or equal to the respective probability of the computing device accessing any other candidate e-book from the set of candidate e-books after accessing the first e-book; and
    responsive to receiving data indicating a user input selecting the second item, send, to the computing device, the second e-book rather than another candidate e-book from the set of candidate e-books when the probability of the computing device accessing the second e-book after accessing the first e-book is greater than or equal to than the probability of the computing device accessing the another candidate e-book after accessing the first e-book.

20. The computer-readable storage medium of claim 19, wherein the attribute includes one of an author, a publisher, a subject, a series set, a title, or a language.

21. The computer-readable storage medium of claim 19, wherein the first probability is based on a quantity of candidate items of the first subset of candidate items, and wherein the second probability is based on a quantity of candidate items of the second subset of candidate items.

22. The computer-readable storage medium of claim 19, wherein execution of the instructions cause the processor to determine the respective probability of the computing device accessing each respective candidate e-book from the set of candidate e-books after accessing the first e-book in response to determining that a quantity of candidate e-books of first subset of candidate e-books is less than a threshold quantity of e-books.

23. The computer-readable storage medium of claim 22, wherein the attribute is a first attribute, wherein the subset of e-books is a first subset of e-books, and wherein execution of the instructions further causes the processor to:
    determine a second attribute of the first e-book;
    determine a second subset of candidate e-books of the set of candidate e-books, wherein a second attribute of each candidate e-book from the second subset of candidate e-books corresponds to the second attribute of the first e-book; and
    determine whether a quantity of candidate e-books of the second subset of candidate e-books is greater than a threshold quantity of e-books,
    wherein the respective probability of the computing device accessing each candidate e-book from the set of candidate e-books after accessing the first e-book is not based on the second subset of candidate e-books when the quantity of candidate e-books of the second subset of candidate e-books is greater than the threshold quantity of e-books.

24. The computer-readable storage medium of claim 19, wherein execution of the instructions further causes the processor to:
    determine whether the first e-book has been accessed by the other computing devices on the network less than the threshold number of times; and recommend the second e-book in response to determining that the first e-book has been accessed less than the threshold number of times.

25. The computer-readable storage medium of claim 19, wherein execution of the instructions causes the processor to determine the respective probability of the computing device accessing the respective candidate e-book from the set of candidate e-books further based on user history data associated with a user of the computing device.

26. The computer-readable storage medium of claim 19, wherein execution of the instructions further causes the processor to determine the quantity of computing devices that have accessed the respective candidate e-book from the set of candidate e-books after accessing the first e-book by at least causing the processor to determine the quantity of computing device that have accessed the respective candidate e-book within a predetermined time window.

* * * * *